United States Patent [19]

Koshiyouji et al.

[11] Patent Number: 5,038,227
[45] Date of Patent: Aug. 6, 1991

[54] IMAGE INFORMATION READING APPARATUS

[75] Inventors: Takashi Koshiyouji, Yokohama; Hiroyuki Mori, Tokyo, both of Japan

[73] Assignee: Kabushiki Kaisha Toshiba, Kawasaki, Japan

[21] Appl. No.: 256,663

[22] Filed: Oct. 13, 1988

[30] Foreign Application Priority Data

Oct. 14, 1987 [JP] Japan .................... 62-258676

[51] Int. Cl.⁵ ............................... H04N 1/10
[52] U.S. Cl. .................... 358/471; 358/474; 358/494
[58] Field of Search .......... 358/256, 293, 294, 285, 358/471, 474, 494, 400; 355/71, 70, 67; 362/31

[56] References Cited

U.S. PATENT DOCUMENTS

| 4,132,478 | 1/1979 | Long et al. | 355/70 |
| 4,729,067 | 3/1988 | Ohe | 362/31 |
| 4,737,857 | 4/1988 | Rucci et al. | 358/294 |
| 4,751,615 | 6/1988 | Abrams | 362/31 |
| 4,803,561 | 2/1989 | Kubota | 358/293 |
| 4,873,579 | 10/1989 | Kubota et al. | 358/471 |
| 4,893,196 | 1/1990 | Koshiyouji et al. | 358/494 |

Primary Examiner—Joseph A. Orsino
Assistant Examiner—Thomas D. Lee
Attorney, Agent, or Firm—Finnegan, Henderson, Farabow, Garrett, and Dunner

[57] ABSTRACT

An image information reading apparatus comprises a glass plate for supporting an original sheet, a light source unit for illuminating an original sheet placed on the glass plate, a scanner adapted to read image information from the original sheet upon receiving a transmitted light beam from the original sheet, and a drive mechanism for moving the scanner along the original sheet. The light source unit includes a planar light source which is wide enough to substantially uniformly illuminate the whole region of the original sheet to be read by means of the scanner.

10 Claims, 3 Drawing Sheets

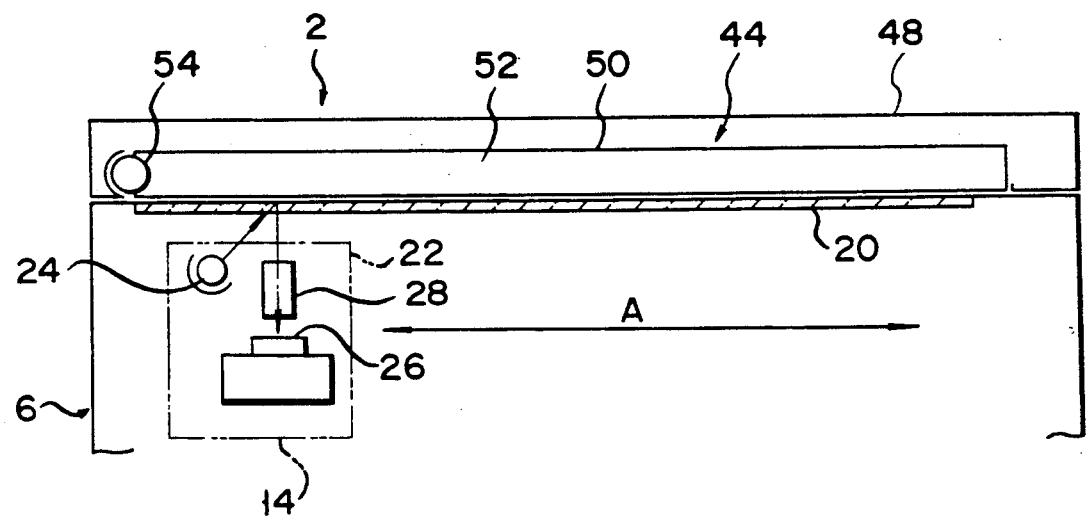
F I G. 3
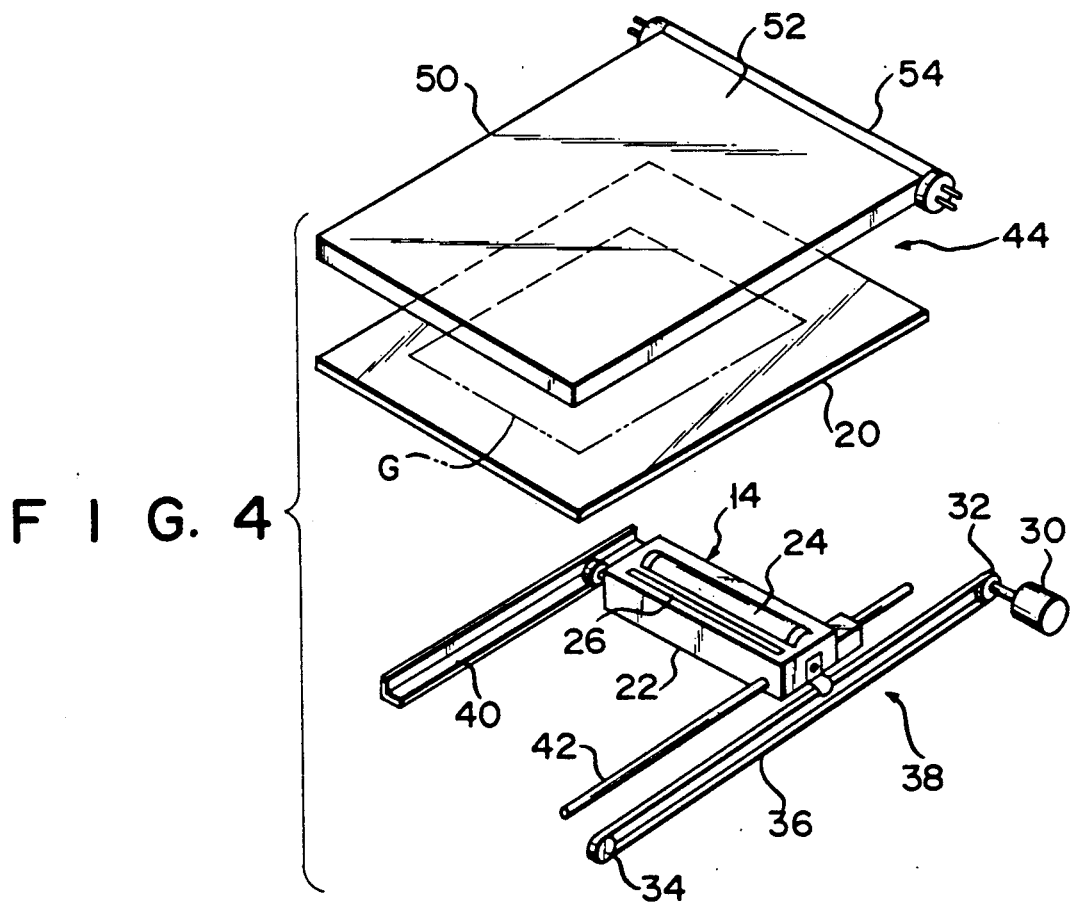
F I G. 4

IMAGE INFORMATION READING APPARATUS

BACKGROUND OF THE INVENTION

1. Field of the Invention

The present invention relates to an image information reading apparatus which can be used in a copying machine, a facsimile, a printer, etc., and which reads image information off an original sheet by utilizing at least transmitted light.

2. Description of the Related Art

An image information reading apparatus is known, as is used in a copying machine or the like, which comprises an original table. This apparatus has a scanner which includes a photoelectric conversion element. An exposure light beam is shone onto an original sheet placed on the original table, and is then either transmitted via or reflected by the original sheet. The photoelectric conversion elements converts this light beam into an electrical signal. The signal, i.e., a desired image signal, is supplied to a host computer or the like.

The apparatus further comprises a control circuit and a drive means of the conventional type. The control circuit controls the drive means. Under the control of the control circuit, the drive means moves the scanner back and forth along the surface of the original table, to scan the original sheet with a light beam.

Conventional information reading apparatuses may be classified into two types; those which read information off original sheets by means of reflected light, and those which do so by means of transmitted light.

Recently, an improved image information reading apparatus has been developed which can read information off original sheets by means of both reflected light and transmitted light. This apparatus comprises a housing, a glass plate mounted on the top of the housing, for supporting the original sheet, a scanner located within the housing, and a light source unit located above the glass plate. The scanner has a photoelectric conversion element and a light source for emitting light which is to be reflected by the original sheet placed on the glass plate. The light source unit has a light source for emitting light which is to be transmitted through the original sheet.

The scanner and the light source of the light source unit oppose, with the glass plate interposed between them. To read information off the original sheet by means of transmitted light, the light source of the light source unit must be moved in synchronism with the scanner, in the same direction at the same speed as the scanner. Hence, the apparatus requires two drive means, one for the scanner and the other for the light source of the light source unit, as well as a drive means for the scanner. Either drive means necessarily must includes a timing belt, a plurality of pulleys, a motor, a speed reducer, etc. Further, the apparatus requires a circuit for controlling both drive means, thereby to drive the scanner and the light source of the light source unit in synchronism. The apparatus is naturally more complex than the apparatus which reads information off an original sheet by means of reflected light or transmitted light. Particularly, the electrical circuit of the apparatus is complicated. It takes a long time to assemble the apparatus, inevitably raising the manufacture cost of the apparatus. Furthermore, the apparatus requires rather a high maintenance cost.

SUMMARY OF THE INVENTION

The object of the present invention is to provide an image information reading apparatus having a simple-structure illumination means for emitting light which is to be transmitted through an original sheet, thereby to read information off the original sheet.

According to the present invention, there is provided an image information reading apparatus which comprises;

original supporting means for supporting an original sheet containing image information;

reading means for receiving image information from an original placed on the original supporting means, thereby to read the image information off the original sheet;

illumination means for illuminating simultaneously the whole area of the original sheet to be read by the reading means; and drive means for moving the reading means and the original supporting means relative to each other.

Since the entire original sheet is uniformly illuminated while information is being read off the original sheet, it suffices to move only the reading means relative to the original sheet. The illumination means need not be moved at all. No drive means is required for the illumination means. Hence, the illumination means is simpler in structure than that used in the prior art apparatus.

BRIEF DESCRIPTION OF THE DRAWINGS

FIG. 3 is a sectional view schematically showing part of the reading apparatus shown in FIG. 1;

FIG. 4 is an exploded perspective view showing part of the reading apparatus shown in FIG. 1.

DETAILED DESCRIPTION OF THE PREFERRED EMBODIMENTS

An embodiment of the present invention will now be described with reference to the accompanying drawings.

Figure 1:
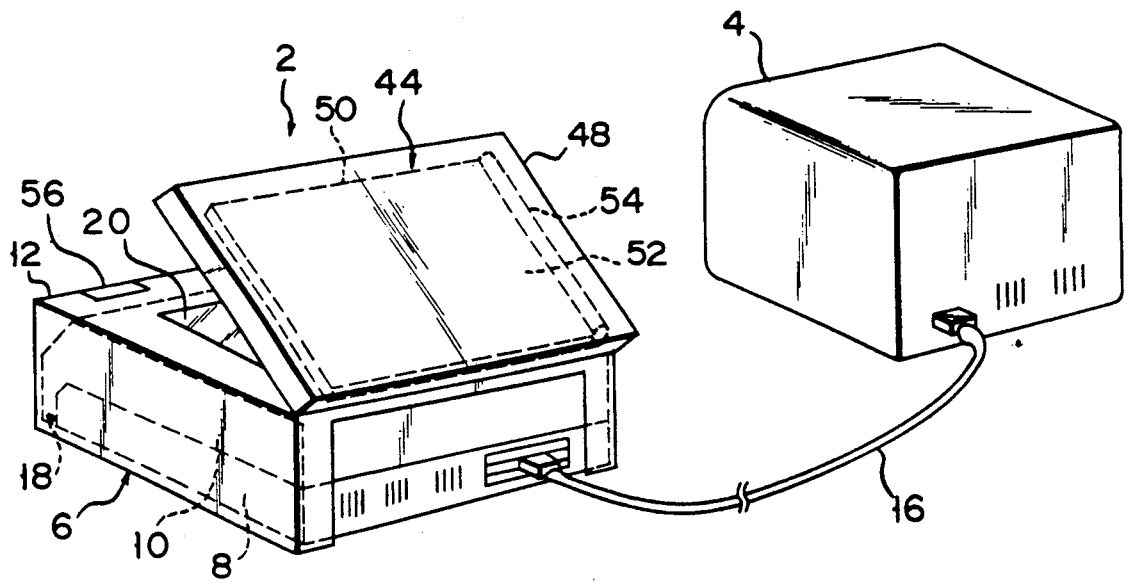
FIG. 1 is a rear perspective view showing an image information reading apparatus according to the present invention and an external apparatus connected thereto.
Figure 2:
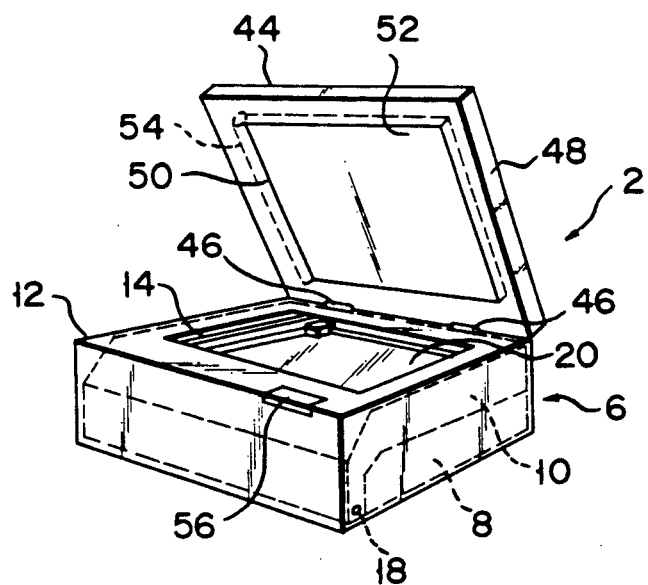
FIG. 2 is a perspective view showing a state in which a light source unit used in the reading apparatus shown in FIG. 1 is open.

In FIGS. 1 and 2, numeral 2 designates an image information reading apparatus. Apparatus 2 is an image scanner which reads information from ordinary original sheets for reflected light and original sheets (positive film, negative film, OHP paper, etc.) for transmitted light, and delivers image signals to external apparatus 4, such as a host computer. Reading apparatus has housing 6, which includes first or lower housing 8, second or upper housing 10, and removable plastic cover 12 enclosing housings 8 and 10. Housing 6 contains a power source unit (not shown), a control circuit board (not shown), scanner 14, etc. The circuit board, which includes such circuits as a GPIB interface board, a scanner processing board, and a scanner image processing board, is connected to external apparatus 4 by means of an interface connector and cable 16 for external apparatus connection. Apparatus 4 may be any type of computer, printer, or electronic filing apparatus.

Pivotal portion 18, including a hinge shaft or the like, is provided at one side (front end as illustrated) of first housing 8. Second housing 10 is supported by pivotal portion 18 so as to be vertically swingable. Platen glass 20 for carrying an original sheet is disposed on the top side of second housing 10. Scanner 14 is located inside glass 20 so as to be movable parallel thereto. As shown in FIG. 3, scanner 14 has carriage 22, which is mounted with straight-tube fluorescent lamp 24, photoelectric converter 26, such as an amorphous image sensor or CCD line image sensor, and optical member 28 such as a rod lens array. Carriage 22 also carries an amplifier substrate (not shown) which contains an amplifier circuit for amplifying the output of converter 26. Scanner 14 is reciprocated in the direction of arrow A of FIG. 3, along guide 40 and rail shaft 42, by means of drive mechanism 38, which is composed of motor 30 with a speed reducer, driving sprocket 32, driven sprocket 34, and timing belt 36, as shown in FIG. 4.

Light source unit 44 for transmitted light is disposed on the top side of housing 6, that is, on that side facing the upper surface of platen glass 20. Unit 44 is pivotally mounted on second housing 10 by means of hinge mechanism 46 so as to be vertically swingable. Light source unit 44 is composed of plastic cover 48 and planar light source 50 located inside the cover.

Light source 50 includes plastic diffusion panel 52, e.g., Backlite Panel (trademark; produced by Mitsubishi Rayon Co., Ltd.), and rod-shaped or straight-tube fluorescent lamp 54 attached to one end side of the panel. The inner surface of panel 52 is treated in a conventional manner in order that a light beam from lamp 54 can be taken out from under panel 52, substantially uniformly throughout the surface of the panel. Planar light source 50 is wide enough to substantially uniformly illuminate the whole region of the original sheet to be read by scanner 14. Thus, the side of the platen glass 20 can be illuminated while the light beam is being diffused. A white or milk white material is used for light source 50 so that the light source can serve as an original cover.

The following is a description of the operation of the apparatus with the aforementioned construction.

In reading image information from an original sheet for reflected light, the original sheet is placed on platen glass 20, lamp 24 of scanner 14 is lit with light source unit 44 closed, and scanner 14 is reciprocated in the direction of arrow A of FIG. 3. A light beam emitted from lamp 24 is reflected by the surface of the original sheet, and a resulting optical image is applied to photoelectric converter 2 via optical member 28. Thus, when the original sheet for reflected light is used, lamp 54 of light source unit 44 is not lit, and panel 52 is used as an original retainer.

In reading image information from an original sheet for transmitted light, on the other hand, the original sheet is placed on platen glass 20, and lamp 54 of planar light source 50 is lit with light source unit 44 closed. As scanner 14 is moved in the direction of arrow A, as in the case of the original sheet for reflected light, an optical image of a light beam, emitted from planar light source 50 and transmitted through the original sheet, is applied to photoelectric converter 26 via optical member 28. Thus, in this case, panel 52 of light source 50 serves both as illumination means for applying the transmitted light beam and as the original retainer.

The original image information, applied to photoelectric converter 26 in this manner, is digitized by means of an A/D converter. The digitized image information is delivered to external apparatus 4 by means of cable 16. The type of the original sheet used is selected by operating a key at operating section 56.

According to the arrangement described above, planar light source 50 is provided in light source unit 44 which is used in reading the original sheet for transmitted light. Therefore, unit 44 does not require any control means for synchronization with the complicated drive mechanism and scanner 14. Since light source unit 44 can be very simple in construction, the apparatus can be readily assembled, and the maintenance is easy. Since planar light source 50 is constructed so that lamp 54 is attached to the one end of panel 52, moreover, light source unit 44 can be reduced in thickness, and in addition, panel 52 itself can serve as the original retainer. Thus, unit 44 can enjoy a thinner, simpler structure.

Figure 5:
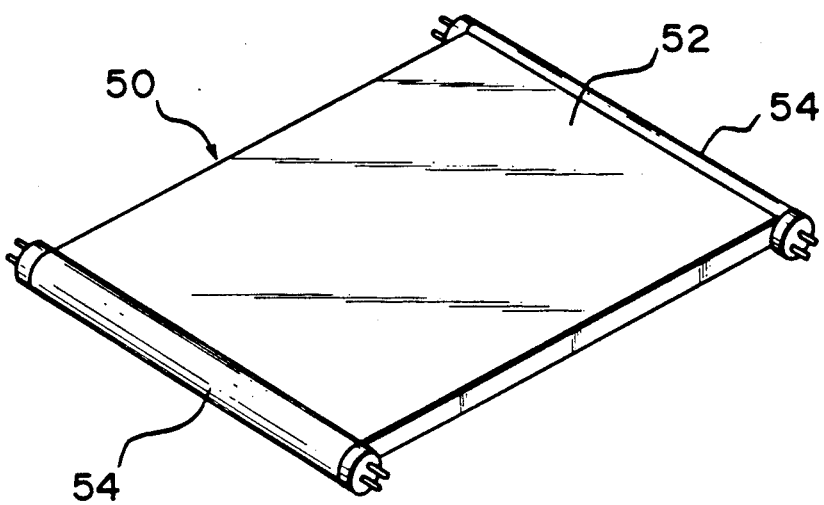
FIG. 5 is a perspective view showing a modification of the light source unit.

In planar light source 50 according to the embodiment described above, lamp 54 is disposed at the one end side of panel 52. Alternatively, however, lamp 54 may be disposed at each end of panel 52, as shown in FIG. 5, in order to obtain a greater quantity of uniform light.

The present invention may be also applied to an original image reading apparatus which is adapted to read image information only from original sheets for transmitted light.

What is claimed is:

1. An image information reading apparatus comprising:
   original supporting means having opposite top and bottom surface sides for supporting an original sheet containing information on the top surface side;
   illumination means disposed above the top surface side of said original supporting means for illuminating simultaneously the whole area of said original sheet at times when said illumination means is energized;
   reading means disposed beneath the bottom surface side of said original supporting means for reading said information from said original sheet, including an illumination unit energizeable to linearly illuminate a portion of said original sheet, and a reading unit for receiving light rays from said original supporting means and converting the light rays into an image of said information contained on said original sheet; and
   drive means for moving said reading means relative to said original supporting means.

2. The image information reading apparatus according to claim 1, where said illumination means includes a planar light source substantially as wide as the region of the original sheet to be read by the reading means.

3. The image information reading apparatus according to claim 2, wherein said planar light source includes a diffusion panel substantially as wide as the region of the original sheet to be read by the reading means, and a linear light source located on one end side of the panel.

4. The image information reading apparatus according to claim 2, wherein said planar light source includes a diffusion panel substantially as wide as the region of the original sheet to be read by the reading means, and a pair of linear light sources located on either end side of the panel.

5. The image information reading apparatus according to claim 1, wherein said illumination means uniformly illuminates the entirety of the original sheet to be read by the reading means.

6. The image information reading apparatus according to claim 1, wherein said illumination means retains said original sheet placed on the top surface side of said original support means.

7. The image information reading apparatus of claim 1, wherein said reading unit of said reading means receives light rays transmitted through said original sheet and said original supporting means at times when said illumination means is energized.

8. The image information reading apparatus of claim 1, wherein said reading unit of said reading means receives light rays reflected from said original sheet and said original supporting means at times when said illumination unit is energized.

9. An image information reading apparatus comprising:
   original supporting means having opposite top and bottom surface sides for supporting an original sheet containing information on the top surface side;
   illumination means disposed above the top surface side of said original supporting means, for illuminating simultaneously the whole area of said original sheet at times when said illumination means is energized;
   reading means disposed beneath the bottom surface side of said original supporting means, for reading said information from said original sheet, including an illumination unit energizeable to linearly illuminate a portion of said original sheet, and a reading unit alternatively receiving light rays from said illumination means transmitted through said original sheet, and light rays from said illumination unit reflected by said original sheet, and converting the light rays into an image of said information contained on said original sheet;
   drive means for moving said reading means respective to said original supporting means; and
   selection means for alternatively energizing said illumination means and said illumination unit.

10. An image information reading apparatus, comprising:
   a housing having an upper surface, said upper surface including original supporting means having opposite top and bottom surface sides for supporting an original sheet containing information on the top surface side;
   a cover means pivotably attached to said housing for covering the upper surface of said housing, including an illumination means disposed above the top surface side of said original supporting means at times when said cover means covers the upper surface of said housing, for illuminating simultaneously the whole area of said original sheet at times when said illumination means is energized;
   reading means movably mounted in said housing beneath the bottom surface side of said original supporting means, for reading said information from said original sheet, including an illumination unit energizeable to linearly illuminate a portion of said original sheet, and a reading unit for receiving light rays from said original supporting means and converting the light rays into an image of said information contained on said original sheet; and
   drive means disposed in said housing for moving said reading means relative to said original supporting means.

* * * * *